Patented Dec. 16, 1930

1,785,464

UNITED STATES PATENT OFFICE

TSUNEO SUZUKI AND HIROSHI TANAKA, OF TOKYO, AND TORAO KURITA, OF TOKYO PREFECTURE, JAPAN, ASSIGNORS TO ZAIDAN HOJIN RIKAGAKU KENKYUJO, OF TOKYO, JAPAN

PROCESS OF PREPARING PURE ALUMINA

No Drawing. Application filed July 6, 1927, Serial No. 203,869, and in Japan February 3, 1927.

This invention relates to a process of preparing pure alumina consisting in treating impure alumina containing silicon, iron, ferro-silicon, or oxides of iron as impurities, with chlorine or hydrochloric acid gas while heated to a temperature above 200° C., with or without the simultaneous use of reducing agents. The object of the invention is to prepare pure alumina from impure alumina containing any or all of the above substances as impurities in a very simple and economical way.

According to this invention, when the impure alumina contains silicon, iron, and ferro-silicon, and no oxides of iron, it is heated with chlorine gas or hydrochloric acid gas to a temperature above 200° C. When it contains oxides of iron besides other impurities, suitable reducing agents such as carbon monoxide may be mixed with the above named gases; or a suitable quantity of carbon may be added to the alumina itself.

When impure alumina containing the above named impurities is treated with chlorine or hydrochloric acid gas at an elevated temperature above 200° C., with or without the addition of reducing agents according to the presence or absence of oxides of iron, the silicon, iron, and ferro-silicon, are all changed into volatile silicon tetrachloride and ferric chloride respectively, while oxides of iron if any are reduced to iron which is at once changed into ferric chloride. As both silicon tetrachloride and ferric chloride are volatile they are at once removed from the alumina leaving it quite pure.

*Example I.*—A clay of following composition was taken as raw material:

| | Per cent |
|---|---|
| Ignition loss | 15.01 |
| Silica | 19.15 |
| Ferric oxide | 16.12 |
| Alumina | 50.90 |

This clay is mixed with 20% of its weight of carbon, and the mixture is heated in an electric furnace according to the known process, and alumina thus produced is separated from the ferro-silicon which is formed by the reduction. Such alumina is not pure and still contains 2.6% of silicon and 3.52% of iron a part of which being as iron oxide. This impure alumina is heated in an atmosphere of chlorine gas containing 10% of carbon monoxide gas to 450° C. for two hours. The remaining product is practically pure alumina in which iron and silicon are reduced to mere traces.

*Example II.*—Taking 200 grms. of clay, the same as in Example I, 25 grms. charcoal powder are added thereto and this mixture is heated at first to 900° C. for 30 minutes while passing in coal gas to first reduce the oxides of iron contained therein to iron. Then the product is charged into an electric arc furnace and is melted. The alumina is separated from ferro-silicon which is formed by the reduction. This alumina, which contains 1.1% silicon and 1.5% iron, is treated with chlorine gas at a temperature of 300° C. for one hour and a half. The resulting product is practically a pure alumina containing only traces of iron and silicon.

The alumina which is obtained by reducing clay or bauxite in electric furnace according to known or any other convenient process usually contains a considerable quantity of silicon, iron, and ferro-silicon, and sometimes oxides of iron as impurities. As these impurities are uniformly fused together with alumina, the separation of such impurities from it to obtain pure alumina has hitherto been difficult.

According to this invention, those impurities are changed into volatile compounds and thereby easily removed from the crude alumina, so that practically pure alumina having only traces of said impurities can be very easily obtained. The crude alumina prepared in an electric furnace is very hard and consequently is ground to powder with difficulty. When pieces of such impure alumina are treated with chlorine or hydrochloric acid gas at an elevated temperature, these gases penetrate through the mass and volatilize off the said impurities from it. The penetration is so effective that crude alumina may be subjected to the treatment even in lump form. After the treatment with chlorine or hydrochloric acid gas, the lumps of alumina become so loose and brittle, owing to the removal of iron and silicon, that it can be easily ground to powder.

Crude alumina such as prepared by so called wet process, containing oxides of iron but no silicon can also be similarly treated according to this invention and pure alumina free from iron can be obtained.

We claim:

1. The process of purifying impure alumina containing silicon, iron, ferro-silicon and oxides of iron as impurities which comprises heating the impure alumina with a carbonaceous reducing agent to reduce the major portion of any iron oxide contained therein and thereafter subjecting the alumina to the action of chlorine gas and carbon monoxide at an elevated temperature until the iron and silicon constituents have been removed as their volatile chlorides.

2. The process of purifying impure alumina containing silicon, iron, ferro-silicon and oxides of iron as impurities which comprises heating the impure alumina with a carbonaceous reducing agent to reduce any iron oxide contained therein and thereafter subjecting the alumina to the action of chlorine gas at an elevated temperature until the iron and silicon constituents have been removed as their volatile chlorides.

In testimony whereof we affix our signatures.

TSUNEO SUZUKI.
HIROSHI TANAKA.
TORAO KURITA.